United States Patent

Aoyama

[11] Patent Number: 5,838,767
[45] Date of Patent: Nov. 17, 1998

[54] METHOD OF SIMULATIVE TESTING STORED PROGRAM CONTROL TYPE ELECTRONIC AUTOMATIC EXCHANGE

[75] Inventor: Mami Aoyama, Tokyo, Japan

[73] Assignee: NEC Corporation, Tokyo, Japan

[21] Appl. No.: 399,547

[22] Filed: Mar. 7, 1995

[30] Foreign Application Priority Data

Mar. 8, 1994 [JP] Japan .................................. 6-037197

[51] Int. Cl.⁶ .............................. H04M 3/08; H04M 3/22
[52] U.S. Cl. .................................. 379/10; 379/14; 379/15; 379/27; 379/29
[58] Field of Search .............................. 379/1, 9, 10, 12, 379/13, 14, 15, 16, 18, 27, 29; 370/216, 248, 249, 252; 455/67.1, 67.4, 423

[56] References Cited

U.S. PATENT DOCUMENTS

| | | | |
|---|---|---|---|
| 4,314,110 | 2/1982 | Breidenstein | 379/23 |
| 4,766,594 | 8/1988 | Ogawa | 379/22 |
| 4,945,554 | 7/1990 | Krause | 379/15 |
| 5,065,422 | 11/1991 | Ishikawa | 379/16 |
| 5,195,085 | 3/1993 | Bertsch et al. | 379/1 |
| 5,276,863 | 1/1994 | Heider | 395/575 |
| 5,384,822 | 1/1995 | Brown | 379/10 |
| 5,384,823 | 1/1995 | Brenski | 379/15 |
| 5,390,232 | 2/1995 | Freeman | 379/10 |
| 5,416,825 | 5/1995 | Renger | 379/10 |
| 5,488,648 | 1/1996 | Womble | 379/13 |
| 5,539,802 | 7/1996 | De Caluwe | 379/14 |

*Primary Examiner*—Vijay Shankar
*Attorney, Agent, or Firm*—Sughrue, Mion, Zinn, Macpeak & Seas, PLLC

[57] ABSTRACT

A simulation system analyzes a call control signal received from an electronic automatic exchange. When it is determined that the received signal is for a trunk connected to another electronic automatic exchange, the simulation system determines an address on a LAN of another simulation system from internal data. Further, the simulation system uses a socket communication function of a UNIX and transmits a signal system, kind, format, etc. of the trunk as character string data. The simulation system which has received the character string data checks the contents of the received character string data. If its contents are found to be proper, then the simulation system generates a corresponding response signal and transmits it to the electronic automatic exchange.

5 Claims, 6 Drawing Sheets

```
SET 1A EL=0120 NORMAL PB DIAL=24343          601
SET 1B EL=0121 NORMAL DP DIAL=24344
SET 1N ET=0100 OUTDTIC MF LOOP DIAL=233
      CONN=128.0.5.3-10
                        603
SET 1O ET=0101 INDTIC DP E-N CONN=128.0.5.10-1U
SET IP OUTDTIC NO7 CCSC=12 CIC=5 OPC=256 DPC=232
                602
```

METHOD OF SIMULATIVE TESTING STORED PROGRAM CONTROL TYPE ELECTRONIC AUTOMATIC EXCHANGE

BACKGROUND OF THE INVENTION

1. Field of the Invention

The present invention relates to a method for simulative testing of a stored program control type electronic automatic exchange, wherein speech path equipment (switch, trunk, tone generator, signal transmitting and receiving device, testing device, subscriber's circuit) of the electronic automatic exchange is simulated so as to test software installed in the electronic automatic exchange.

2. Description of the Prior Art

According to a known method of simulatively testing this type of stored program control type electronic automatic exchange, a test for simulating a trunk and a common channel signaling terminal both connected to another electronic automatic exchange within one simulation system has been carried out by using a method of simulatively connecting an outgoing/connecting trunk connected to another electronic automatic exchange to the simulation system and an incoming/connecting trunk connected from another electronic automatic exchange, and turning back a monitor or supervisory signal and a select signal transmitted to the outgoing/connecting trunk to the incoming/connecting trunk to thereby receive the turned-back signal. Further, the simulation test has been carried out by a method of simulatively connecting a common channel signaling terminal connected to another electronic automatic exchange to each other and turning back and receiving a common channel signal transmitted from the corresponding common channel signaling terminal to another electronic automatic exchange from another common channel signaling terminal simulatedly connected to the corresponding electronic automatic exchange.

Figure 1:
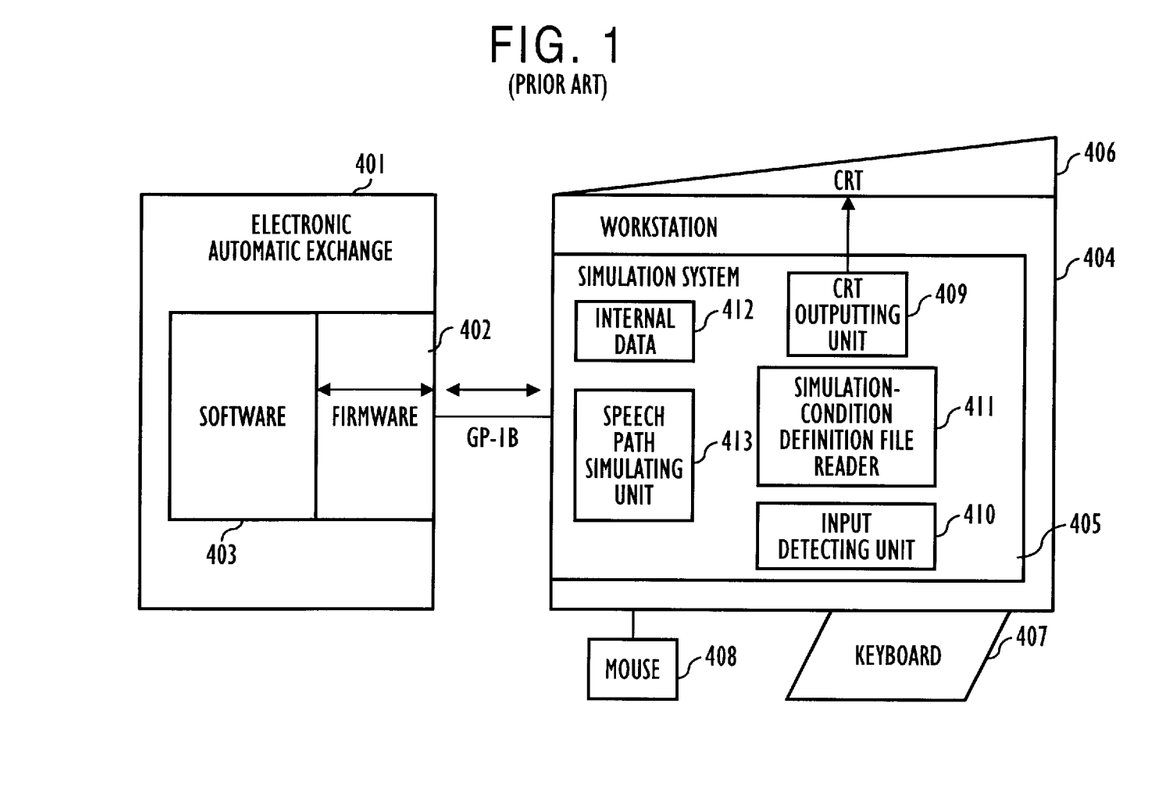
FIG. 1 is a view showing the structure of a conventional example of a simulation system in which an electronic automatic exchange is employed.

FIG. 1 is a view showing the basic construction of a simulation system employed in a stored program control type electronic automatic exchange without speech path equipment.

An electronic automatic exchange 401 without speech path equipment is intended to test software 403 provided in the electronic automatic exchange 401. Firmware 402 takes in a signal outputted to speech path equipment from the software 403 of the electronic automatic exchange 401 and transmits it to a workstation 404 connected to the electronic automatic exchange 401 through a GP-IB using a data transfer function of the GP-IB. Further, the firmware 402 delivers a signal received from the workstation 404 using the data transfer function of the GP-IB to the software 403 of the electronic automatic exchange 401.

The simulation system 405 comprises a speech path simulating unit 413, a CRT outputting unit 409, an input detecting unit 410 and a simulation condition definition file reader 411 for reading a file in which simulation conditions have been defined. The simulation system 405 is operated in the workstation 404. A keyboard 407 and a mouse 408 are included in the work station 404. When the speech path simulating unit 413 receives a call control signal transmitted from the firmware 403 of the electronic automatic exchange 401, the file reader 411 analyzes the call control signal with reference to internal data 412 in which the simulation condition definition file has been read. If the call control signal is found to be a start signal for a trunk connected to another electronic automatic exchange, then the file reader 411 generates a response signal corresponding to the start signal received as if the start signal has been received from another electronic automatic exchange, so as to be supplied to a trunk simulatively connected by return to the above trunk and transmits it to the firmware 402 of the electronic automatic exchange 401 connected to the work station 404 through the GP-IB. Further, the file reader 411 allows the CRT outputting unit 409 to graphically display the result of simulation on a CRT 406 of the workstation 404. The input detecting unit 410 reads an input entered via the keyboard 407 and the mouse 408. Next, the speech path simulating unit 413 generates a response signal corresponding to the input and transmits it to the firmware 402 of the electronic automatic exchange 401.

In the above return test, data used for the return test is preset to the software 403 of the electronic automatic exchange 401 so as to avoid contradiction even if the signal received by return is received.

The simulation system 405 analyzes and simulates the call control signals received from the firmware 402 one by one. In a test of a repeater station, there is a case in which a selected figure must be transmitted when a trunk for the transmission of a select signal is connected to an outgoing/connecting trunk, a simulatively-connected incoming/connecting trunk is connected to another outgoing/connecting trunk and a trunk for the reception of the select signal is connected to the incoming/connecting trunk simulatively connected to another outgoing/connecting trunk. However, when the call control signal for the transmission of the select signal is received in accordance with the sequence of the call control signal received by the simulation system 405 from the electronic automatic exchange 401 before the pass of the incoming/connecting trunk is connected to that of the outgoing/connecting trunk, an actual electronic automatic exchange is activated without problems because hardware processes instantaneously but the speech path simulating unit 413 of the simulation system 405 is brought into a state in which the select signal is not transmitted.

Figure 2:
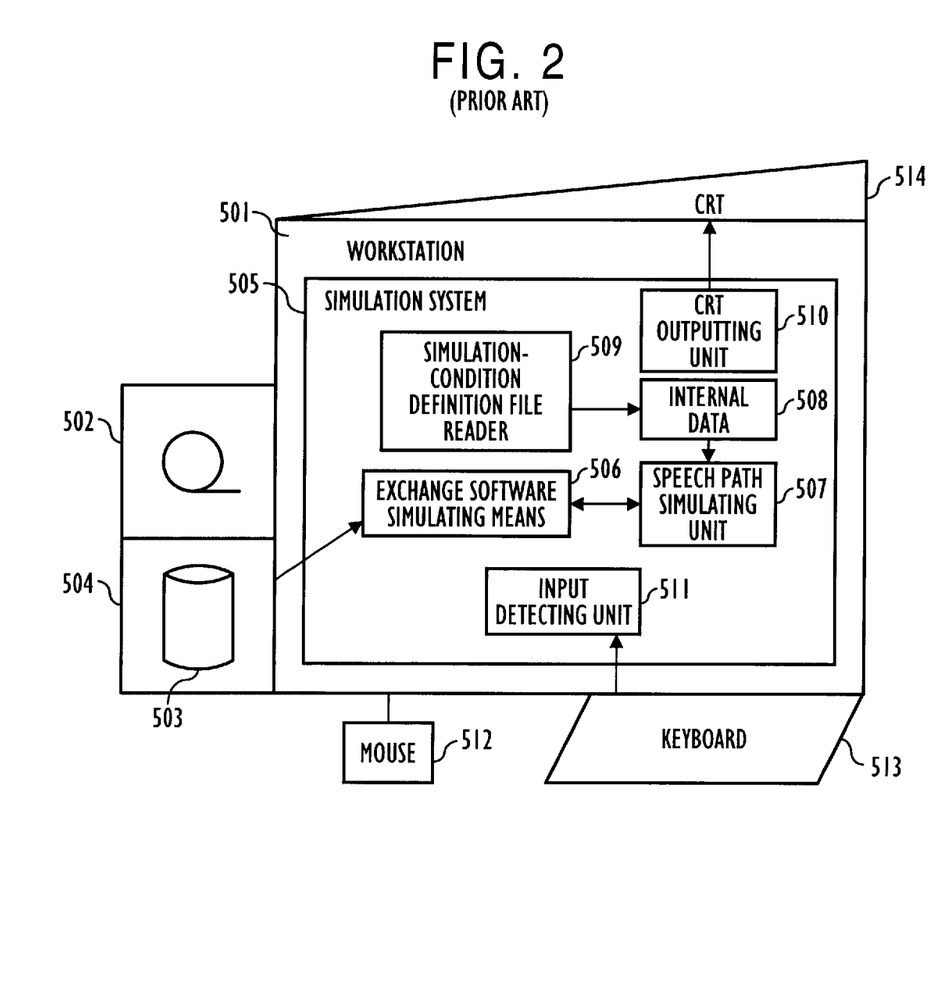
FIG. 2 is a view illustrating the structure of another conventional example of a simulation system in which an electronic automatic exchange is not employed.

FIG. 2 is a view illustrating a basic construction of a simulation system without an electronic automatic exchange, for reading a load module of software for an electronic automatic exchange into a disk unit of a workstation and simulating the exchange software by the workstation.

A simulation system 505 comprises an exchange software simulating unit 506, a speech path simulating unit 507, a CRT outputting unit 510, an input detecting unit 511 and a simulation condition definition file reader 509 for reading a file in which simulation conditions have been defined. The simulation system 505 is operated in a workstation 501. A CRT 514, a mouse 512 and a keyboard 513 are attached to the workstation 501. An exchange software load module 503 is read into a disk unit 504 of the workstation 501 through a magnetic tape unit 502. The exchange software simulating unit 506 simulates the software for the electronic automatic exchange while simulating a machine code of the load module 503 for each command. When the exchange software simulating unit 506 simulates a command for outputting a signal to the speech path equipment, the exchange software simulating unit 506 delivers a signal to the speech path simulating unit 507 and is inputted with a signal delivered from the speech path simulating unit 507 when a command for inputting the signal is simulated.

The file reader 509 analyzes the signal received by the speech path simulating unit 507 with reference to internal data 508 in which the simulation condition definition file has been read, and performs a simulative operation of the speech path equipment. Thereafter, the file reader 509 generates a response signal corresponding to the result of simulation and delivers it to the exchange software simulating unit 506. Further, the file reader 509 causes the CRT outputting unit 510 to display the result of simulation on the CRT 514 of the work station 501.

The detecting means 511 reads an input supplied via the keyboard 513 and the mouse 512 of the workstation 501. Next, the speech path simulating unit 507 generates a response signal corresponding to the input and delivers it to the exchange software simulating unit 506.

Figure 3:
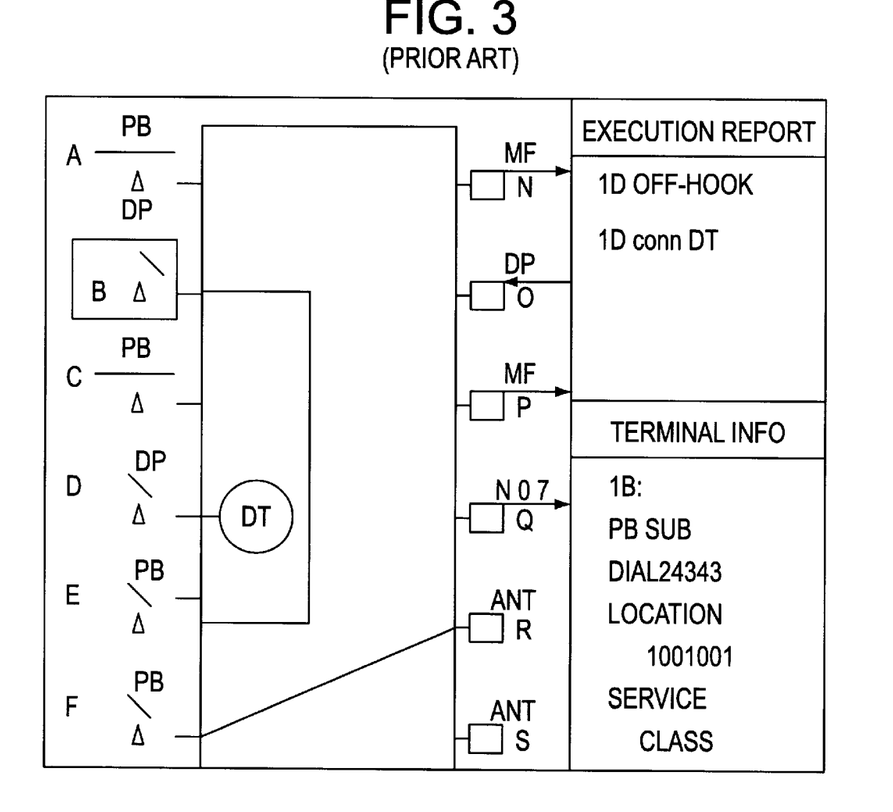
FIG. 3 is a view for describing one example in which the result of simulation of the simulation system is displayed.

FIG. 3 describes one example in which the result of simulation of the speech path equipment in the simulation system 505 is displayed on the CRT 514.

Figure 4:
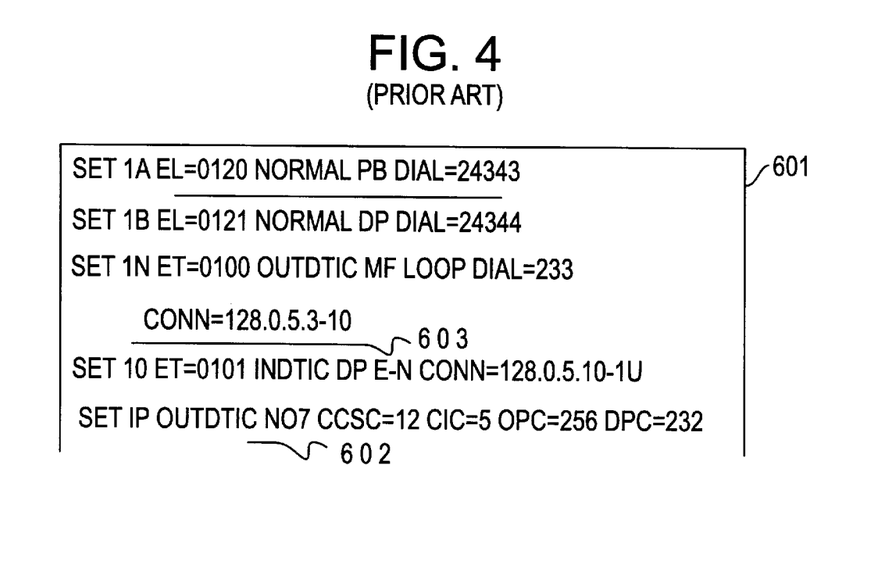
FIG. 4 is a view for describing one example of a file in which simulation conditions have been defined.

FIG. 4 shows one example of a file in which simulation conditions of a simulation system are defined.

The simulation condition definition file is a text file created within a disk unit or a memory of a workstation by an editor or the like. When the simulation system 505 starts, the file reader 509 of the simulation system 505 reads the internal data 508 of the simulation system 505, classes 601 such as classes of a PB/PD signal and telephone subscriber, a public telephone subscriber, a multi-party telephone subscriber, an ISDN terminal, a call trunk and a tone, a class of a testing device, a class of a speech path simulating device such as a signal transmitting and receiving device, a class 602 of a signal for a speech path simulating device, such as an MF, an MFC, a DP or a No. 7 common line signal or the like, and address information 603 for other simulation systems connected to a LAN, all classes of which have been defined in the above file, and holds the read information in the internal data 508. Further, the file reader 509 refers to such information when the received signal is analyzed and the response signal is generated.

It is necessary for the aforementioned conventional method to set return testing data to the software for the electronic automatic exchange. When it is desired to carry out the test on a repeater station, a problem arises because it is necessary to set a plurality of folded or return data and since control signals originally outputted to respective speech path equipment from a plurality of electronic automatic exchanges and separately processed by the respective speech path equipment are outputted to a corresponding simulation system from a single electronic automatic exchange one by one and are simulated one by one, a delay occurs and a simulation of the operation of actual speech path equipment cannot be carried out.

SUMMARY OF THE INVENTION

It is an object of the present invention to provide a method of simulatively testing a stored-program control type electronic automatic exchange which is capable of eliminating the need for the supply of return data to an exchange software when that software is tested using a simulation system, and preventing a simulative operation of speech path equipment from being disabled due to a delay.

According to one aspect of the present invention, for achieving the above object, there is provided a method of simulatively testing a stored program control type electronic automatic exchange, wherein simulation systems connected to the network respectively simulate operations of trunks and common channel signaling terminals connected to other electronic automatic exchanges by transmitting and receiving character string data between the trunks of the electronic automatic exchanges in place of a control signal or a common channel signal, which is to be transferred between the trunks of electronic automatic exchanges, with the use of the data communication function of a network between a plurality of simulation systems connected to the network.

The present invention features that a test for the transfer of the control signal and the common line signal between the software for the electronic automatic exchange and other electronic automatic exchanges is carried out between the simulation systems connected to the network by transmitting and receiving necessary information in the form of character string data. Thus, the test can be carried out in the form near an actual operating form regardless of the test using the simulation systems. It is also unnecessary to supply return data for the use of the simulation system to the exchange software. Therefore, the simulative operation of the speech path equipment can be prevented from being disabled due to the delay. Further, the quality of the test on the exchange software is improved, the efficiency of the test is enhanced, and software productivity is increased.

The simulative testing method according to the present invention is carried out in two ways similar to the prior art: by connecting respective simulation systems to their corresponding electronic automatic exchanges to thereby simulate trunks and common channel signaling terminals, and by simulating a load module for exchange software, which has been read into a magnetic disk unit, without connecting respective simulation systems to their corresponding electronic automatic exchanges.

The above and other objects, features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 5:
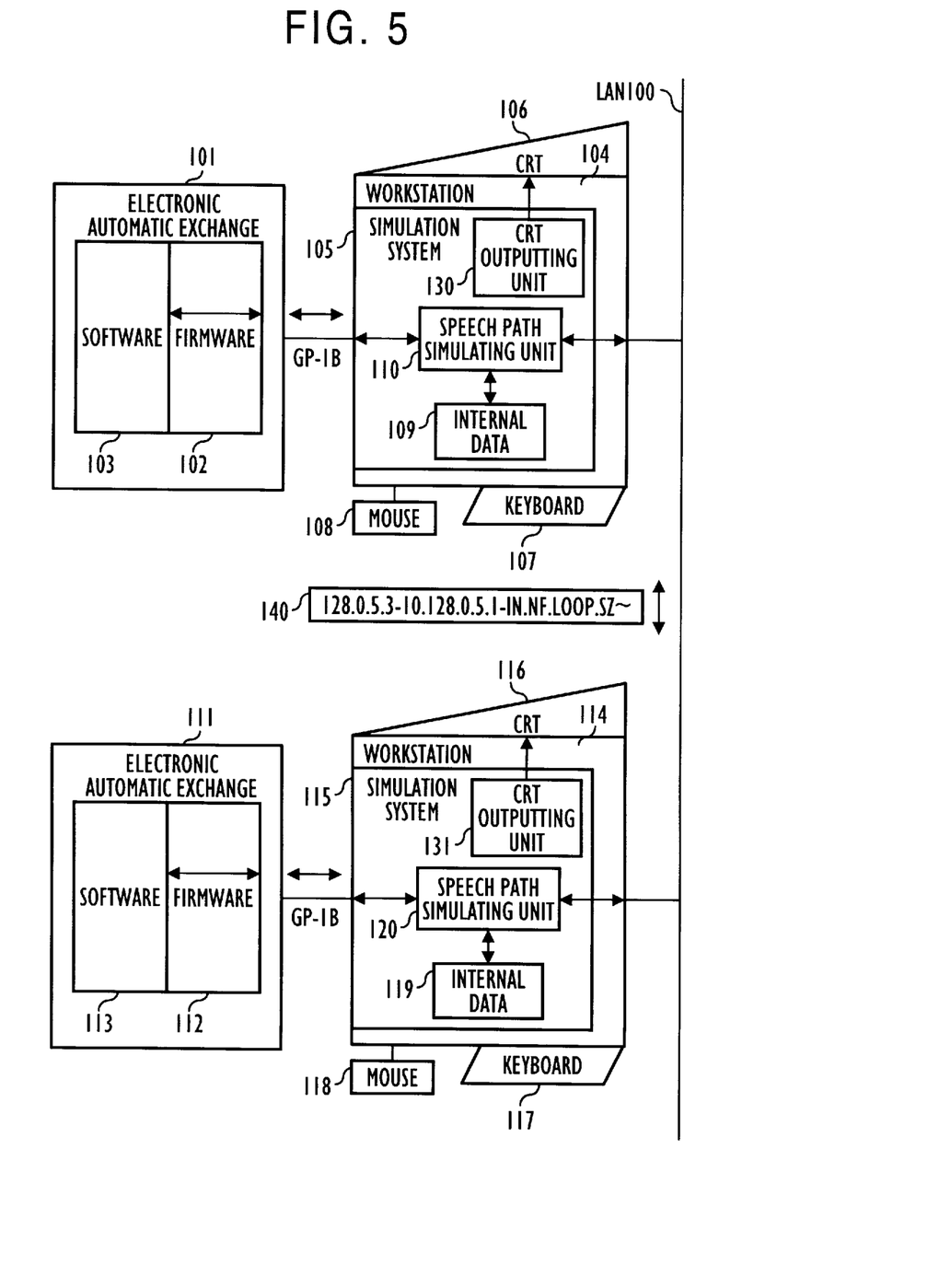
FIG. 5 is a view illustrating the structures of simulation systems using electronic automatic exchanges, according to a first embodiment of the present invention.
Figure 6:
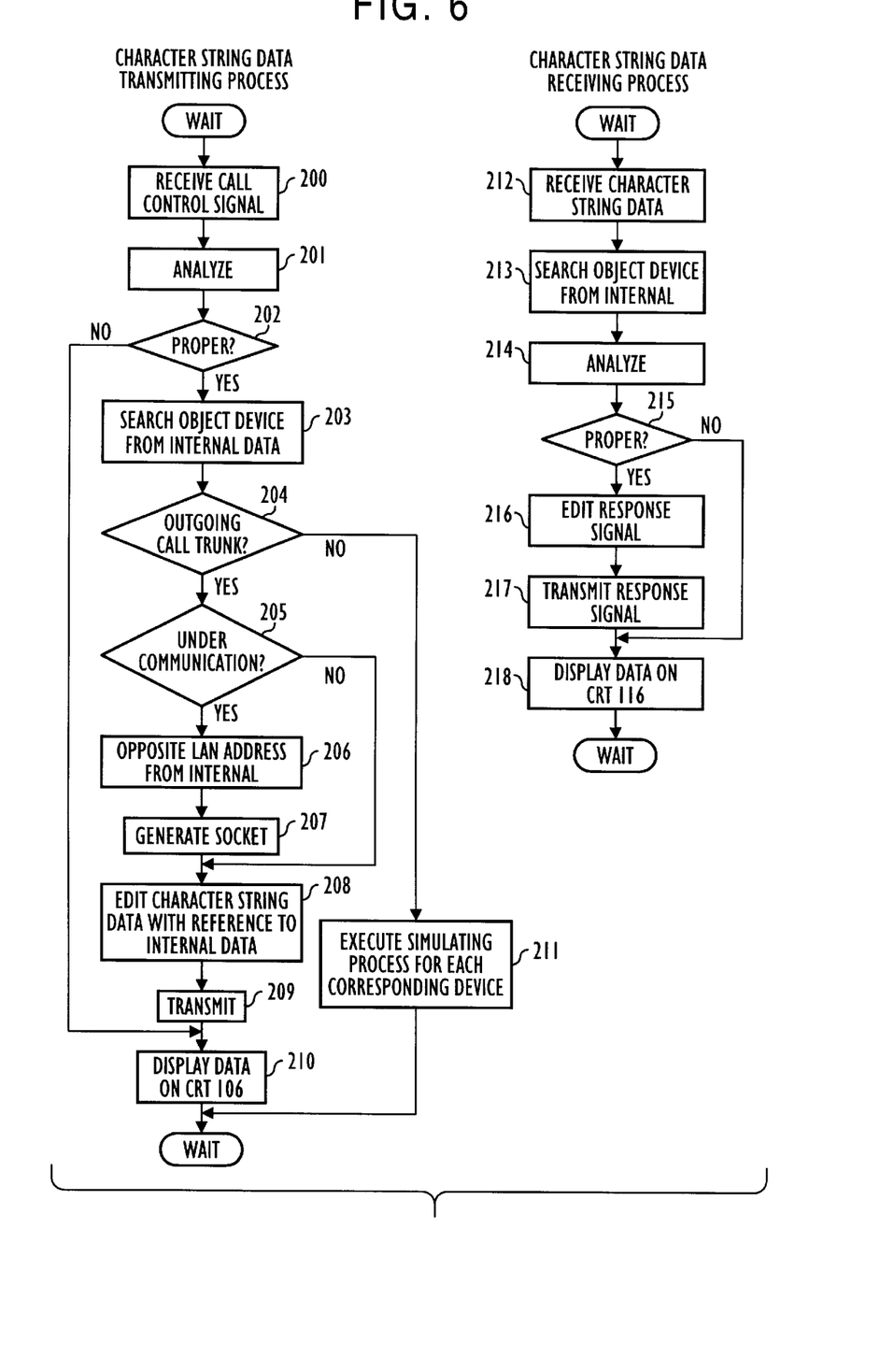
FIG. 6 is a view showing the structures of simulation systems excluding electronic automatic exchanges, according to a second embodiment of the present invention.

FIG. 5 is a view showing the structures of simulation testing systems using electronic automatic exchanges, according to a first embodiment of the present invention. FIG. 6 is a flowchart for describing a character string data transmitting process and a character string data receiving process both executed by the present embodiment.

Workstations 104 and 114 are electrically connected to a LAN 100. At the same time, the workstations 104 and 114 are electrically connected to electronic automatic exchanges 101 and 111 without speech path equipment through GP-IBs respectively. Firmware 102 of the electronic automatic exchange 101 takes in a call control signal indicative of a start signal outputted to the speech path equipment from software 103 of the electronic automatic exchange 101 and transmits it to the workstation 104.

When a speech path simulating unit 110 of a simulation system 105 operated in the workstation 104 receives the call control signal sent from the firmware 102, the speech path simulating unit 110 analyzes it with reference to internal data 109 in Steps 200 and 201. Further, the speech path simulating unit 110 checks in Step 202 whether the contents of the call control signal are proper or correct, specifically, a data value of the call control signal is correct and the class of a signal for a telephone/trunk and the class of the call control signal are proper. If the answer is YES in Step 202, then the speech path simulating unit 110 searches in Step 203 to which telephone or trunk the call control signal has been transmitted from an inner position where the call control signal is held. Thereafter, the speech path simulating unit 110 determines in Step 204 whether the transmitted call control signal has been transmitted to an outgoing call trunk. If the answer is NO in Step 204, then the speech path simulating unit 110 effects a simulating process on an object device in Step 211. If the answer is YES in Step 204, then the speech path simulating unit 110 determines in Step 205 whether the workstation 104 is under communication. If the answer is YES in Step 205, then the speech path simulating unit 110 determines an address on the LAN 100 of a workstation to be connected from received internal data stored in other simulation systems connected to the LAN 100 in Step 206. Next, a UNIX serving as an OS of the workstation uses a socket communication function provided as a process communication function of the LAN in Step 207. In Steps 208 and 209, the UNIX edits character string data 140 such as the class of a trunk monitor signal, the sign of a trunk select signal, etc. and transmits it to the simulation system 115 of the corresponding other workstation 114. If the answer is NO in Step 205, then the speech path simulating unit 110 edits the character string data 140 with reference to the internal data 109 and transmits it to the simulation system 115 in Steps 208 and 209. Thereafter, a CRT outputting means 130 displays the designation of the call control signal received from the electronic automatic exchange 101 and the designation of a signal transmitted to the simulation system 115 on the network on a CRT 106 in Step 210.

When a speech path simulating unit 120 of the simulation system 115 in the workstation 114 receives the character string data 140 in Step 212, the speech path simulating unit 120 searches an object device from internal data 119 in Step 213 and checks with reference to the internal data 119 in Steps 214 and 215 whether the received data is proper. If the answer is YES in Step 215, then the speech path simulating unit 120 generates a response signal corresponding to the received start signal in Step 216 and transmits it to firmware 112 of the electronic automatic exchange 111 connected to the simulation system 115 through the GP-IB, so as to be delivered to software 113 of the electronic automatic exchange 111 in Step 217. Thereafter, a CRT displaying unit 131 displays the designation of a call control signal received from the electronic automatic exchange and the designation of a signal transmitted to the other simulation system on the network on the CRT 116 in Step 218. When the software 113 of the electronic automatic exchange 111 outputs a call control signal indicative of a start completion in response to the received signal, the firmware 112 transmits it to the workstation 114. Thereafter, the speech path simulating unit 120 of the simulation system 115 analyzes the received call control signal with to the internal data 119. If the speech path simulating unit 120 determines the call control signal as the start completion signal for a call trunk, then the speech path simulating unit 120 uses a socket communication function and transmits the class of a signal for monitoring an electronic automatic exchange and the sign of a select signal to the work station 105 in communication at present as character string data.

The speech path simulating unit 110 of the simulation system 105 in the workstation 104, which has received the data, checks with reference to the internal data 109 whether the received data is proper. If the speech path simulating unit 110 determines that the received data is proper, then the speech path simulating unit 110 generates a response signal responding to the received start completion signal and transmits it to the firmware 102 of the electronic automatic exchange 101 connected thereto through the GP-IB. The firmware 102 delivers the received signal to the software 103 of the electronic automatic exchange 101.

Figure 7:
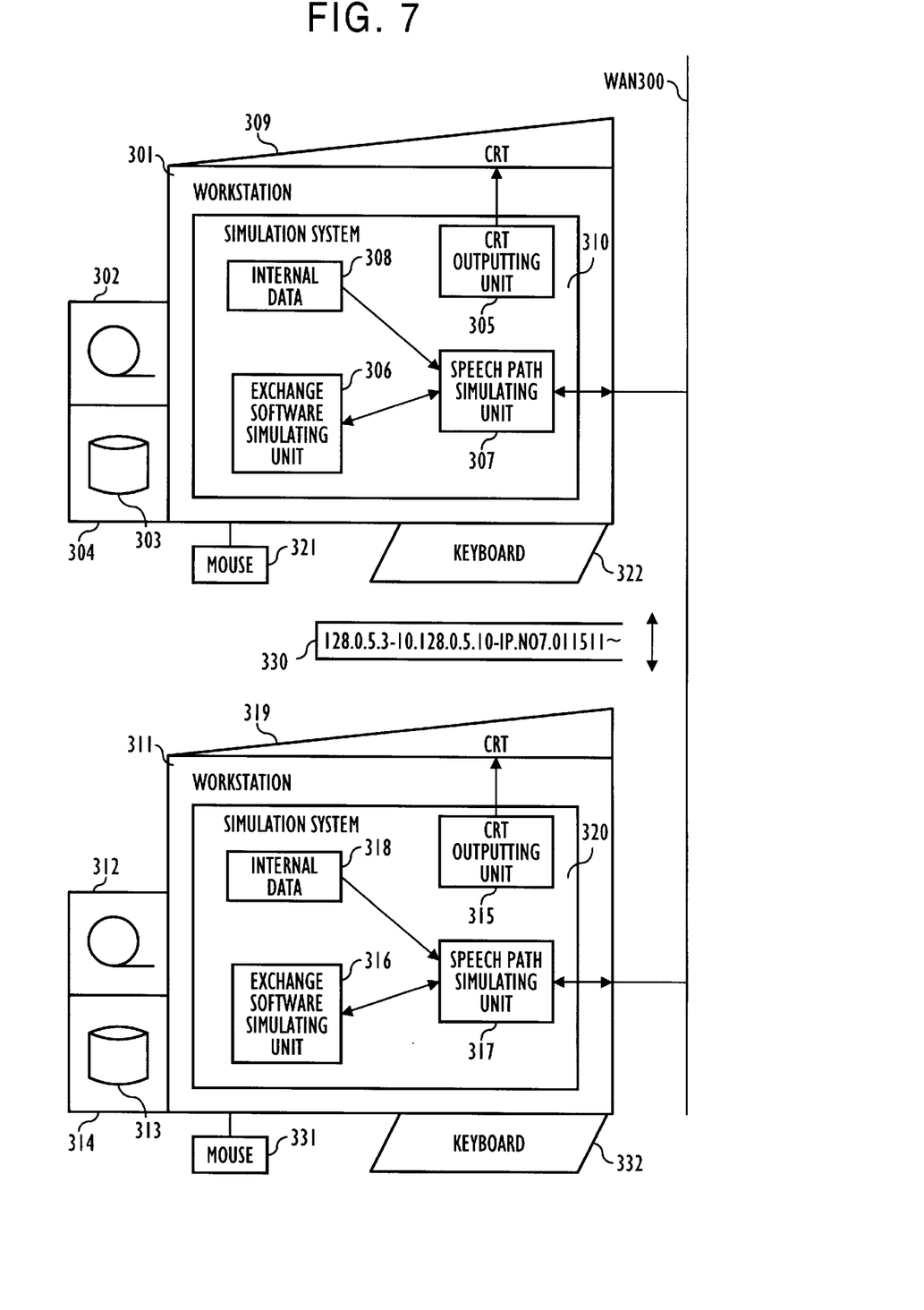
FIG. 7 is a flowchart for describing the flow of processes executed by the first and second embodiments.

FIG. 7 is a view illustrating the structures of simulation testing systems without electronic automatic exchanges, according to a second embodiment of the present invention.

Workstations 301 and 311 are electrically connected to a WAN 300. Load modules 303 and 313 for software of electronic automatic exchanges, which have been read into magnetic disk units 304 and 314 of the workstations 301 and 311 respectively, are respectively simulated by exchange software simulating units 306 and 316 of simulation systems 310 and 320.

When the exchange software simulating unit 306 simulates a command or instruction to output a No. 7 signal of a common channel signaling terminal to speech path equipment for the load module 303 of the exchange software, the exchange software simulating unit 306 delivers the No. 7 signal to a speech path simulating unit 307. The speech path simulating unit 307 analyzes the message class or parameter value of the delivered No. 7 signal and parameter values with reference to internal data 308. When the result of analysis is found to be a signal indicative of a call set-up request message, the speech path simulating unit 307 determines an address on the WAN 300 of a workstation of a common channel signaling terminal device to be connected from the internal data 308 stored in a simulation system connected to the WAN 300. Next, a UNIX serving as an OS of the workstation uses a socket communication function provided as a process-to-process communication function for the WAN 300 and transmits a No. 7 signal to the simulation system 320 of workstation 311 as character string data 330.

A speech path simulating unit 317 of the simulation system 320 in the workstation 311, which has received the character string data 330, checks with reference to internal data 318 whether the received data is proper. If the received data is found to be correct, then the speech path simulating unit 317 converts the received data into a No. 7 signal format and delivers it to the exchange software simulating unit 316. When the No. 7 signal inputted to the load module 313 of the exchange software is simulated by the exchange software simulating unit 316, the delivered No. 7 signal is given as input data.

The exchange software simulating unit 316 delivers a No. 7 signal outputted in response to the No. 7 signal inputted with the load module 313 to the speech path simulating unit 317 when a command for outputting the No. 7 signal is simulated.

The speech path simulating unit 317 analyzes the message class and parameter value of the received No. 7 signal with reference to the internal data 318. If the result of analysis is found to be a response message, then the speech path simulating unit 317 transmits the No. 7 signal to the work station 301 under communication at present as character string data with a socket communication function.

The speech path simulating unit 307 of the simulation system 310 in the workstation 301, which has received the data, checks with reference to the internal data 308 whether the received data is proper. If the received data is found to be correct, then the speech path simulating unit 307 converts the received data into a No. 7 signal format and delivers it to the exchange software simulating unit 306. When a command for inputting the No. 7 signal is simulated, the No. 7 delivered to the exchange software simulating unit 306 is given as input data.

Although certain preferred embodiments of the present invention have been shown and described in detail, it should be understood that various changes and modifications may be made therein without departing from the scope of the appended claims.

What is claimed is:

1. A method of simulatively testing a stored program control type electronic automatic exchange, wherein a plurality of simulation systems are connected directly to a network to simulate operations of trunks or common channel signaling terminals, and wherein said automatic exchange to be tested is directly connected to one of said plurality of simulation systems, and another of said plurality of simulation systems is directly connected to another electronic automatic exchange, said method comprising the steps of transmitting and receiving, between the trunks of the electronic automatic exchanges, character string data which are representative of, and are transmitted and received in place of, a control signal or a common channel signal which is to be transferred between said trunks, using a data communication function of said network between said plurality of simulation systems.

2. The method as claimed in claim 1, wherein said simulation is carried out through the connection of each said simulation system with each said electronic automatic exchange, respectively.

3. The method as claimed in claim 1, wherein load modules of the software for the electronic automatic exchanges, which have been read into magnetic disk units, are simulated without connecting said simulation systems to the electronic automatic exchanges respectively.

4. A method of simulatively testing a stored program control type electronic automatic exchange, wherein a plurality of simulation systems connected to a network simulate operations of trunks or common channel signaling terminals connected to another electronic automatic exchange, comprising the steps of transmitting and receiving, between the trunks of the electronic automatic exchanges, character string data which are representative of, and are transmitted and received in place of, a control signal or a common channel signal which is to be transferred between said trunks, using a data communication function of said network between said plurality of simulation systems;

wherein said simulation is carried out through the connection of each said simulation system with each said electronic automatic exchange, respectively; and further comprising the steps of:

receiving, by the simulation system on the transmitting side, a control signal for transmitting a monitor signal or a select signal, from an electronic automatic exchange without speech path equipment, which is connected to said simulation system and analyzing the received signal by the simulation system;

determining an address on the network for the simulation system on the receiving side from internal data when the received signal is found to be a control signal for the speech path equipment connected to another electronic automatic exchange;

transferring the class of the monitor signal for the speech path equipment, the sign of a select signal and the like to the simulation system on the receiving side as character string data;

checking whether the character string data is proper when the simulation system on the receiving side receives the character string data;

generating a response signal corresponding to the received monitor signal or select signal if the character string data is found to be proper and transmitting it to the software in the electronic automatic exchange connected to the simulation system on the receiving side;

analyzing the control signal for transmitting the monitor signal or the select signal when said control signal is received from the electronic automatic exchange;

transferring the class of the monitor signal for the electronic automatic exchange, the sign of the select signal and the like to the simulation system on the transmitting side as character string data when the received signal is found to be the control signal for the speech path equipment connected to the simulation system on the transmitting side;

checking by the simulation system on the transmitting side whether the received signal is proper; and generating a response signal corresponding to the received monitor signal or select signal if it is determined that the received signal is proper and transmitting it to the software in the electronic automatic exchange connected to the simulation system on the transmitting side.

5. A method of simulatively testing a stored program control type electronic automatic exchange, wherein a plurality of simulation systems connected to a network simulate operations of trunks or common channel signaling terminals connected to another electronic automatic exchange, comprising the steps of transmitting and receiving, between the trunks of the electronic automatic exchanges, character string data which are representative of, and are transmitted and received in place of, a control signal or a common channel signal which is to be transferred between said trunks, using a data communication function of said network between said plurality of simulation systems;

wherein load modules of the software for the electronic automatic exchanges, which have been read into magnetic disk units, are simulated without connecting said simulation systems to the electronic automatic exchanges respectively; and further comprising the steps of:

analyzing, by a simulation system on the transmitting side, a message class and a parameter value of a common line signal when a command for outputting the common line signal to a speech path equipment for a load module of an electronic automatic exchange is simulated by the simulation system;

determining an address on a network for the simulation system on the receiving side from internal data when the result of analysis is found to be a common channel signal to be supplied to a common channel signaling terminal connected to another electronic automatic exchange;

transmitting the common channel signal to the simulation system on the receiving side as character string data;

checking by the simulation system on the receiving side whether the received character string data is proper;

converting the received character string data into the original common channel signal if the received character string data is proper and delivering it to exchange software simulating means;

receiving a common channel signal outputted by the exchange software load module in response to an inputted common line signal from the exchange software simulating means and analyzing the received common line signal;

transmitting the response signal to the simulation system on the transmitting side as character string data when the received signal is found to be the common channel signal to be supplied to the common channel signaling terminal connected to the simulation system on the transmitting side;

checking by the simulation system on the transmitting side whether the received character string data is proper; and converting the received character string data into the original common channel signal if the received character string data is found to be proper and delivering it to the exchange software simulating means.

* * * * *